Oct. 27, 1931. A. T. REID 1,829,491
CEMENT PIPE
Filed Oct. 24, 1929
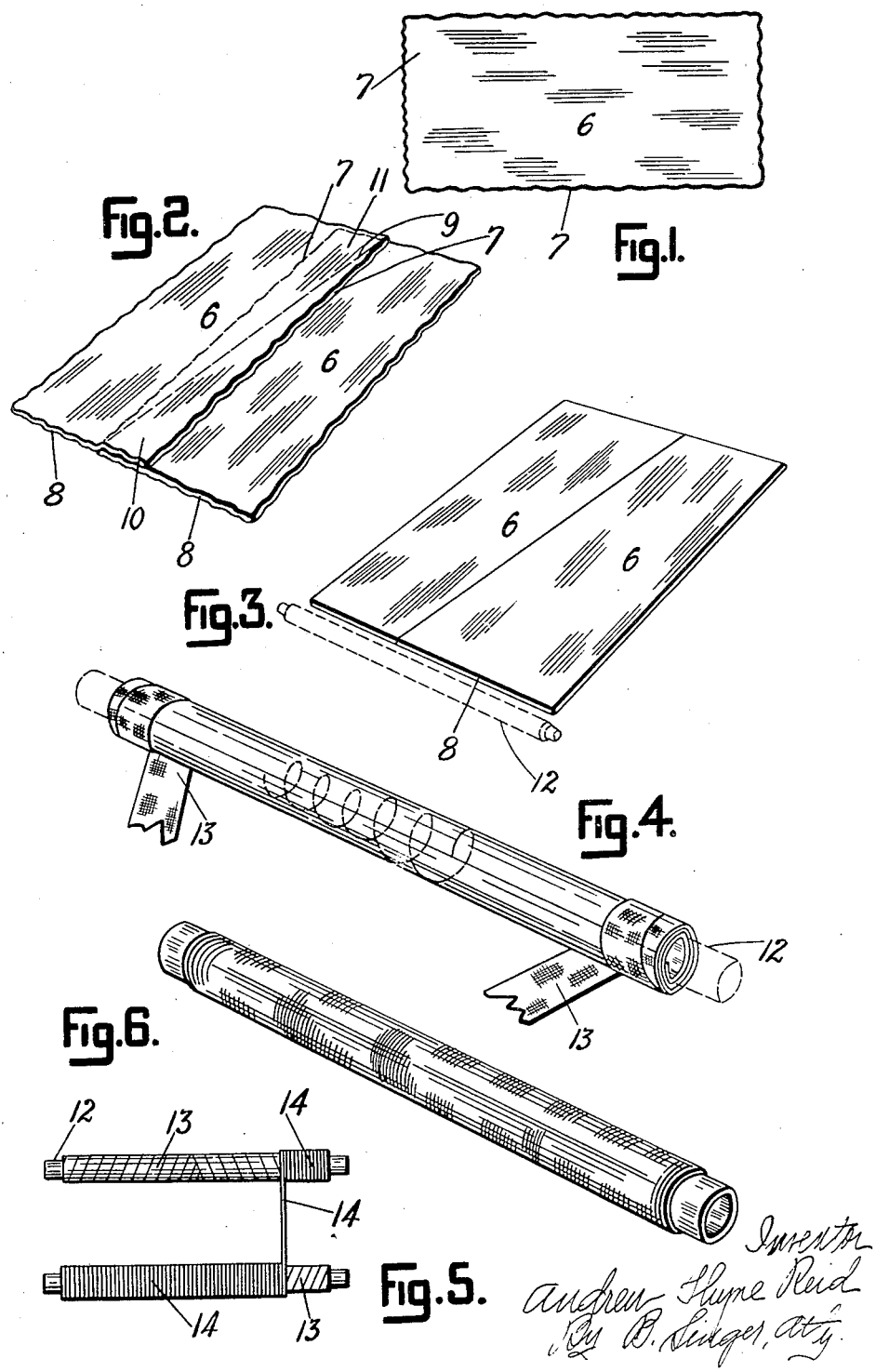

Patented Oct. 27, 1931.

1,829,491

UNITED STATES PATENT OFFICE

ANDREW THYNE REID, OF CAMELLIA, NEAR SYDNEY, NEW SOUTH WALES, AUSTRALIA

CEMENT PIPE

Application filed October 24, 1929, Serial No. 402,297, and in Australia November 29, 1928.

This invention has reference to improvements in and relating to cement pipes and is especially directed to cement pipes made from asbestos and like sheeting when in the green state.

It is well known that the width of asbestos cement sheets being manufactured in machines upon rollers, is in common practice generally restricted to narrow widths not exceeding six feet. The circumference of the rollers determines the length of the sheet capable of being made in the machine and the fibrous reinforcement is to a greater extent disposed parallel to the length of the sheet during manufacture. The circumference of the roller can be varied within limits but the width is strictly limited by the width of the machine.

Attempts have been made to form long pipes from asbestos cement sheets made in such a narrow machine by rolling the sheet lengthwise upon a mandrel. This method although producing a long pipe from a narrow sheet is not entirely satisfactory for the reason that the reinforcing fibres are to a greater extent disposed parallel to the longitudinal axis of the pipe and consequently do not give sufficient strength as a reinforcement unless the wall of the pipe is made too thick for economical production.

An object of the present invention is to enable a comparatively long asbestos cement pipe to be made from sheets produced in a narrow machine, such as one having a roller approximately four or six feet in width substantially equal in strength to a pipe made on a machine the full width of the length of the pipe.

A further object of the invention is to enable a comparatively long pipe to be made from narrow green asbestos cements sheets and with the greater proportion of the reinforcing fibres disposed transversely to the longitudinal axis of the pipe.

According to the present invention the asbestos cement sheets are made in the usual manner upon a large roller in an asbestos cement sheet making machine and have their reinforcing fibres disposed substantially parallel to their length.

Two or more sheets so formed, while in the green state are placed side by side and have their meeting edges cut to form a diagonal butt joint.

The meeting edges may be overlapped and the sheets cut diagonally to produce the diagonal butt joint.

After the sheets have been placed side by side and formed with a diagonal joint they are rolled upon a mandrel and subjected to external pressure to form a homogeneous joint.

This method of construction enables a long pipe to be formed, that is practically uniform in structure and has its reinforcing fibres disposed to a large extent transversely to the axis of the pipe. The pipe is therefore less likely to be ruptured, due to internal or external stresses.

But in order that the invention may be clearly understood, reference is now made to the accompanying drawings wherein are illustrated the stages in the production of a complete pipe, from two sheets of asbestos cement formed and joined in accordance with the invention.

Figure 1 is a plan view of a sheet of asbestos cement.

Figure 2 represents two sheets overlapped, ready for cutting in accordance with the procedure adopted in the first stage of production of a pipe.

Figure 3 shows the sheets after they have been cut and butted together, ready for rolling upon a mandrel.

Figure 4 shows the sheets wound upon a mandrel and also shows portion of the wrapping strips.

Figure 5 is a diagrammatic view illustrating a method employed for winding the compressing medium upon the sheets.

Figure 6 shows the finished pipe with trimmed and turned ends.

The green sheets 6 after being formed in known manner are laid side by side with their longitudinal edges 7—7 overlapping and their transverse edges 8—8 disposed in line and extending a distance equal to the length of pipe desired. In this position of the sheets, the reinforcing fibres represented by the shade lines in Figures 1 and 2, are disposed parallel to the edges 7—7 and transversely to the edges 8—8.

The overlapping longitudinal edges 7—7 are cut along the line 9 and the triangular sections 10, 11 are removed leaving a diagonal butt joint.

For repetition work the sheets may be cut diagonally before they are placed side by side.

The sheets while still disposed in butted relation are wound upon a mandrel 12 in such manner that their transverse edges 8—8 are parallel to the axis of the mandrel and the reinforcing fibres are to a great extent disposed transversely to the mandrel 12.

As the winding of the sheets upon the mandrel 12 progresses the diagonal butt joint assumes a spiral formation, see Figure 4, which at any one point is covered or protected by several layers of the wound sheet.

A fabric strip 13 preferably is wound helically upon the roller sheet to hold the layers together while external pressure is applied thereto for the purpose of effecting a homogeneous joint.

The pressure may be applied by coiling upon the wrapped sheets a wire rope 14 as shown diagrammatically in Figure 5. Preferably the rope 14 is wound from a completed pipe to another pipe to apply pressure thereto.

After the rope 14 and binding strips 13 have been removed from the partly finished pipe, the latter is allowed to remain upon the mandrel, and is put aside to permit the cement to harden whereupon the mandrel may be collapsed and removed, and the pipe allowed to cure.

The pipe is subsequently trimmed and may be turned at its ends to produce the finished article shown in Figure 5.

It will be understood that the length of pipes which can be manufactured in accordance with the invention is limited only by the practicable length of mandrels employed.

I claim.

1. The process of making an asbestos cement pipe from two or more green asbestos cement sheets having one of their longitudinal edges disposed diagonally to their transverse edges, which consists in placing the respective diagonal edges of the sheets side by side and their transverse edges parallel to a mandrel, and simultaneously rolling the so placed sheets upon the mandrel to form a pipe wherein the reinforcing fibres incorporated in the said sheets are disposed to a greater extent transversely to the longitudinal axis of the pipe.

2. The process of making an asbestos cement pipe from two or more green asbestos cement sheets having one of their longitudinal edges disposed diagonally to their transverse edges, which consists in placing the sheets side by side so that their longitudinal meeting edges are disposed diagonally to their transverse edges and form a diagonal butt joint, one of the transverse edges of each sheet being disposed adjacent to a mandrel, winding the said sheets simultaneously upon the mandrel to form a pipe, the convolutions of the assembled sheets being disposed concentrically upon the mandrel, said diagonal butted edges forming a spiral joint which is overlapped by one or more of the concentric convolutions of the sheets, said assembled concentric sheets being wrapped with a binder strip and subjected to external pressure by winding a wire thereon for the purpose of uniting the diagonal meeting edges of the respective sheets.

In testimony whereof I have hereunto set my hand.

ANDREW THYNE REID.